United States Patent [19]

Magnani

[11] B 3,923,994

[45] Dec. 2, 1975

[54] ANTI-ARTHRITIC COMPOSITIONS COMPRISING A 3-ARYL 2-THIOHYDANTOIN AND METHODS OF PRODUCING ANTI-ARTHRITIC ACTIVITY

[75] Inventor: Arthur Magnani, Wynnewood, Pa.

[73] Assignee: SmithKline Corporation, Philadelphia, Pa.

[22] Filed: July 13, 1973

[21] Appl. No.: 379,038

[44] Published under the Trial Voluntary Protest Program on January 28, 1975 as document no. B 379,038.

[52] U.S. Cl.............................. 424/273; 260/309.5
[51] Int. Cl.².......................................... A61K 31/415
[58] Field of Search.................. 424/273; 260/309.5

[56] References Cited

OTHER PUBLICATIONS

Chem. Abst.(1), 55–4507f (1962).
Chem. Abst.(2), 65–2246b (1966).

*Primary Examiner*—Stanley J. Friedman
*Attorney, Agent, or Firm*—Richard D. Foggio; William H. Edgerton

[57] ABSTRACT·

A pharmaceutical composition having anti-arthritic activity is comprised of a 3-aryl-2-thiohydantoin. Anti-arthritic activity is produced by methods of internally administering said compositions.

11 Claims, No Drawings

ANTI-ARTHRITIC COMPOSITIONS COMPRISING A 3-ARYL 2-THIOHYDANTOIN AND METHODS OF PRODUCING ANTI-ARTHRITIC ACTIVITY

This invention relates to novel pharmaceutical compositions having anti-arthritic activity and to methods of producing anti-arthritic activity by administering said compositions. More specifically, the compositions of this invention comprise a 3-aryl-2-thiohydantoin as the active medicament.

The novel pharmaceutical compositions of this invention, in dosage unit form, comprise a nontoxic pharmaceutical carrier and a 3-aryl-2-thiohydantoin of the following formula:

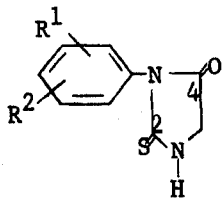

in which $R^1$ and $R^2$ are hydrogen, chloro, bromo, fluoro or alkyl of one or two carbon atoms, at least one of $R^1$ and $R^2$ being other than hydrogen.

Preferred compositions of this invention are those comprised of a nontoxic pharmaceutical carrier and a compound of Formula I in which $R^1$ and $R^2$ are hydrogen, chloro or fluoro, at least one of $R^1$ and $R^2$ being other than hydrogen.

The compounds of Formula I are either known or are prepared by condensation of an aryl isothiocyanate, a compound of the formula

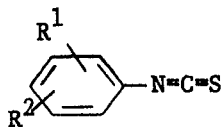

with $R^1$ and $R^2$ defined as above, with glycine in the presence of a base such as sodium hydroxide in aqueous medium containing a minimum amount of a solvent such as dioxane. The condensation is carried out by stirring the reaction mixture at 25° for from 1 to 2 hours followed by heating the aqueous phase with a mixture of acetic acid and dilute hydrochloric acid to give the desired 3-aryl-2-thiohydantoin.

The required aryl isothiocyanates are prepared by the reaction of an appropriately substituted aryl amine, for example a substituted aniline, with thiophosgene ($CSCl_2$) according to known methods.

The anti-arthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses of from 25 mg. to 50 mg. per kilogram of body weight. Adjuvant arthritis in rats is produced by a single injection of 0.75 mg. of *Mycobacterium butyricum* suspended in white paraffin (N.F.) into a hindpaw (left footpad). The injected leg becomes inflamed and reaches a maximum volume in three to five days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The pharmaceutical compositions of this invention are prepared in conventional dosage unit forms by incorporating an amount of a compound of Formula I sufficient to produce anti-arthritic activity, without toxic effects, with a non-toxic pharmaceutical carrier according to accepted procedures. Preferably the compositions will contain a 3-aryl-2-thiohydantoin of Formula I in an amount of from 25 mg. to about 200 mg. per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly, the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method in accordance with this invention comprises administering internally to an animal organism a 3-aryl-2-thiohydantoin of Formula I, usually combined with a pharmaceutical carrier, in an amount sufficient to produce anti-arthritic activity. The active medicament will be administered in a dosage unit, preferably in an amount of from about 25 mg. to about 200 mg. The route of administration may be orally or parenterally, the oral route being preferred. Advantageously equal oral doses will be administered 3 times daily with the daily dosage regimen being from about 75 mg. to about 600 mg. When the method described above is carried out, anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of Formula I and their incorporation into pharmaceutical compositions of this invention, and as such are not to be considered as limiting the invention set forth in the claims appended hereto. Temperatures are in degrees centigrade unless otherwise stated.

EXAMPLE 1

3-(2'-Chlorophenyl)-2-thiohydantoin

To a solution of 3.0 g. (0.04 mol.) of glycine and 1.6 g. (0.04 mol.) of sodium hydroxide in 50 ml. of water was added a solution of 6.8 g. (0.04 mol.) of o-chlorophenyl isothiocyanate in 20 ml. of dioxane. The reaction mixture was stirred at 25° for 1.5 hours then concentrated in vacuo. The residual aqueous solution was washed with ether and acidified with dilute hydrochloric acid. The resulting precipitate was collected by filtration and added to 60 ml. of acetic acid and 20 ml. of dilute hydrochloric acid. This mixture was heated until complete solution, then cooled to cause precipitation of the title compound which was collected by filtration, m.p. 193.5°–196°.

EXAMPLE 2

3-(4'-Chlorophenyl)-2-thiohydantoin

To a solution of 3.8 g. (0.05 mol.) of glycine and 2.0 g. (0.05 mol.) of sodium hydroxide in 60 ml. of water was added 8.5 g. (0.05 mol.) of p-chlorophenyl isothiocyanate and enough dioxane to make the reaction mixture homogeneous. The mixture was stirred at 25° for 1.5 hours, filtered and the filtrate was acidified with dilute hydrochloric acid. The precipitate was collected and heated with 70 ml. of dilute hydrochloric acid and 50 ml. of acetic acid for 1.25 hours. The solution was cooled and the precipitate collected by filtration and washed with water to give the title compound, m.p. 227°–228.5°.

EXAMPLE 3

3-(3',4'-Dichlorophenyl)-2-thiohydantoin

To a solution of 3.0 g. (0.04 mol.) of glycine and 1.6 g. (0.04 mol.) of sodium hydroxide in 50 ml. of water was added 8.15 g. (0.04 mol.) of 3,4-dichlorophenyl isothiocyanate and enough dioxane to make the reaction mixture homogeneous. The mixture was stirred at 25° for two hours then filtered and the filtrate extracted with ether. The aqueous layer was heated with 60 ml. of acetic acid and 40 ml. of dilute hydrochloric acid until complete solution, then cooled to cause precipitation of the title compound which was collected by filtration, m.p. 204°.

EXAMPLE 4

3-(4'-Fluorophenyl)-2-thiohydantoin

To a solution of 3.8 g. (0.05 mol.) of glycine and 2.0 g. (0.05 mol.) of sodium hydroxide in 60 ml. of water was added 7.7 g. (0.05 mol.) of p-fluorophenyl isothiocyanate and enough dioxane to make the reaction mixture homogeneous. The mixture was stirred at 25° for 2 hours then filtered. The filtrate was acidified with dilute hydrochloric acid and the precipitate collected by filtration and heated with 50 ml. of acetic acid and 50 ml. of dilute hydrochloric acid until complete solution. The solution was cooled and the precipitate was collected and recrystallized from acetic acid to give the title compound, m.p. 221°–223°.

EXAMPLE 5

Substitution of an equivalent amount of an aryl isothiocyanate listed below:
  m-chlorophenyl isothiocyanate
  p-bromophenyl isothiocyanate
  o-fluorophenyl isothiocyanate
  2,4-difluorophenyl isothiocyanate
  2,5-difluorophenyl isothiocyanate
  2,4-dibromophenyl isothiocyanate
in the procedure of Example 3 for 3,4-dichlorophenyl isothiocyanate gives the following 3-aryl-2-thiohydantoins:
  3-(3'-chlorophenyl)-2-thiohydantoin
  3-(4'-bromophenyl)-2-thiohydantoin
  3-(2'-fluorophenyl)-2-thiohydantoin
  3-(2',4'-difluorophenyl)-2-thiohydantoin
  3-(2',5'-difluorophenyl)-2-thiohydantoin
  3-(2',4'-dibromophenyl)-2-thiodydantoin.

EXAMPLE 6

When equivalent amounts of 2-chloro-4-methylphenyl isothiocyanate and 4-chloro-2-methylphenyl isothiocyanate are substituted in the procedure of Example 3 for 3,4-dichlorophenyl isothiocyanate, 3-(2'-chloro-4'-methylphenyl)-2-thiohydantoin and 3-(4'-chloro-2'-methylphenyl)-2-thiohydantoin are obtained, respectively.

In a similar manner, 3-(2'-fluoro-4'-methylphenyl)-2-thiohydantoin is obtained from substitution of an equivalent amount of 2-fluoro-4-methylphenyl isothiocyanate in the procedure of Example 3 for 3,4-dichlorophenyl isothiocyanate.

EXAMPLE 7

When an equivalent amount of an aryl isothiocyanate listed below:
  o-tolyl isothiocyanate
  p-tolyl isothiocyanate
  2,4-dimethylphenyl isothiocyanate
  p-ethylphenyl isothiocyanate
is substituted in the procedure of Example 3 for 3,4-dichlorophenyl isothiocyanate, the following 3-aryl-2-thiohydantoins are obtained:
  3-(o-tolyl-2-thiohydantoin
  3-(p-tolyl)-2-thiohydantoin
  3-(2',4'-dimethylphenyl)-2-thiohydantoin
  3-(4'-ethylphenyl)-2-thiohydantoin.

EXAMPLE 8

| Ingredients | Mg./Tablet |
| --- | --- |
| 3-(4'-fluorophenyl)-2 thiohydantoin | 25 |
| Calcium sulfate, dihydrate | 150 |
| Sucrose | 25 |
| Starch | 15 |
| Talc | 5 |
| Stearic acid | 3 |

The sucrose, calcium sulfate and 3-(4'-fluorophenyl)-2-thiohydantoin are thoroughly mixed and granulated with hot 10 percent gelatin solution. The wetted mass is passed through a No. 6 mesh screen directly onto drying trays. The granules are dried at 120°F. and passed through a No. 20 mesh screen, mixed with the starch, talc and stearic acid and compressed into tablets.

Similarly, the other 3-aryl-2-thiohydantoins disclosed herein may be formulated into tablets.

EXAMPLE 9

| Ingredients | Mg./Capsule |
|---|---|
| 3-(4'-fluorophenyl)-2-thiohydantoin | 200 |
| Magnesium stearate | 5 |
| Lactose | 250 |

The above ingredients are screened through a No. 40 mesh screen, mixed and filled into No. 0 hard gelatin capsules.

In like manner, the other 3-aryl-2-thiohydantoins of this invention may be formulated into capsules.

What is claimed is:

1. A tablet or capsule pharmaceutical composition having anti-arthritic activity, in dosage unit form, comprising a nontoxic pharmaceutical carrier and an effective but nontoxic amount of a 3-aryl-2-thiohydantoin of the formula:

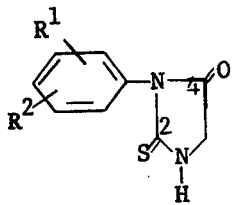

in which $R^1$ and $R^2$ are hydrogen, chloro, bromo, fluoro or alkyl of one or two carbon atoms, at least one of $R^1$ and $R^2$ being other than hydrogen.

2. A pharmaceutical composition according to claim 1 in which $R^1$ and $R^2$ are hydrogen, chloro or fluoro, at least one of $R^1$ and $R^2$ being other than hydrogen.

3. A pharmaceutical composition according to claim 2 in which $R^1$ is fluoro in the 4-position and $R^2$ is hydrogen.

4. A pharmaceutical composition according to claim 2 in which $R^1$ is chloro in the 2-position and $R^2$ is hydrogen.

5. A pharmaceutical composition according to claim 2 in which $R^1$ is chloro in the 4-position and $R^2$ is hydrogen.

6. A pharmaceutical composition according to claim 2 in which $R^1$ is chloro in the 3-position and $R^2$ is chloro in the 4-position.

7. A pharmaceutical composition according to claim 1 in which the amount of the active medicament is from 25 mg. to about 200 mg.

8. The method of producing anti-arthritic activity which comprises administering internally to an animal organism in need of said activity and in an amount sufficient to produce said activity a 3-aryl-2-thiohydantoin of the formula:

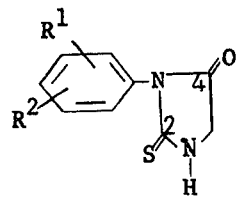

in which $R^1$ and $R^2$ are hydrogen, chloro, bromo, fluoro or alkyl of one or two carbon atoms, at least one of $R^1$ and $R^2$ being other than hydrogen.

9. The method according to claim 8 in which $R^1$ and $R^2$ are hydrogen, chloro or fluoro.

10. The method according to claim 9 in which $R^1$ is fluoro in the 4-position and $R^2$ is hydrogen.

11. The method according to claim 8 in which the active medicament is administered orally in a daily dosage regimen of from about 75 mg. to about 600 mg.

* * * * *

UNITED STATES PATENT OFFICE
CERTIFICATE OF CORRECTION

PATENT NO. : 3,923,994
DATED : Dec. 2, 1975
INVENTOR(S) : Arthur Magnani

It is certified that error appears in the above-identified patent and that said Letters Patent are hereby corrected as shown below:

[54] The title, "3-aryl 2-" should read --3-aryl-2- --

Column 1, line 3, "3-aryl 2-" should read --3-aryl-2- --

Column 1, lines 15-23, --FORMULA I-- should appear underneath the structural formula Signed and Sealed this twenty-fifth Day of May 1976

[SEAL]

Attest:

RUTH C. MASON
Attesting Officer

C. MARSHALL DANN
Commissioner of Patents and Trademarks